(12) United States Patent
Clinton et al.

(10) Patent No.: US 9,329,926 B1
(45) Date of Patent: May 3, 2016

(54) OVERLAPPING DATA INTEGRITY FOR SEMICONDUCTOR DEVICES

(71) Applicant: PMC-Sierra US, Inc., Sunnyvale, CA (US)

(72) Inventors: David Joseph Clinton, Coopersburg, PA (US); Larrie Simon Carr, Kelowna (CA); Manthiramoorthy Ponmanikandan, Chennai (IN)

(73) Assignee: Microsemi Storage Solutions (U.S.), INC., Aliso Viejo, CA (US)

( * ) Notice: Subject to any disclaimer, the term of this patent is extended or adjusted under 35 U.S.C. 154(b) by 123 days.

(21) Appl. No.: 14/026,029

(22) Filed: Sep. 13, 2013

(51) Int. Cl.
| | | |
|---|---|---|
| G06F 11/10 | (2006.01) | |
| G06F 12/00 | (2006.01) | |
| G11B 20/18 | (2006.01) | |
| H03M 13/11 | (2006.01) | |
| G11C 29/52 | (2006.01) | |

(52) U.S. Cl.
CPC .................................... *G06F 11/10* (2013.01)

(58) Field of Classification Search
CPC . G06F 11/165; G06F 11/1658; G06F 11/004; G06F 11/10; G06F 11/1044; G06F 12/0815; G06F 11/22; G06F 11/1064; G06F 12/0855; G06F 2212/1032; G06F 7/4991; G06F 11/1076; G06F 3/064; H04L 69/40; G11B 20/18

USPC ........... 714/758, 805, 763, E11.032, E11.037
See application file for complete search history.

(56) References Cited

U.S. PATENT DOCUMENTS

| | | | | |
|---|---|---|---|---|
| 5,313,627 A | * | 5/1994 | Amini et al. | ..................... 714/53 |
| 5,675,579 A | * | 10/1997 | Watson et al. | ................ 370/248 |
| 8,316,277 B2 | | 11/2012 | Flynn et al. | |
| 8,799,747 B2 | * | 8/2014 | Goss et al. | ..................... 714/773 |
| 2007/0271468 A1 | | 11/2007 | McKenney et al. | |
| 2013/0242656 A1 | * | 9/2013 | Sakaue et al. | ............ 365/185.09 |
| 2014/0032992 A1 | * | 1/2014 | Hara et al. | ..................... 714/773 |

* cited by examiner

*Primary Examiner* — Phung M Chung
(74) *Attorney, Agent, or Firm* — Dennis R. Haszko

(57) ABSTRACT

A data integrity (DI) protection circuit and method provide overlapping DI protection without increasing memory requirements. Write data parity is checked after write data error correcting code (ECC) check bits are generated, which is stored with the write data in memory without storing the write data parity. A corrupt location cache stores the write address and a write response error is generated when a write data parity error or write address parity error is detected. Read data and read data ECC check bits retrieved from the memory are checked and single bit errors are corrected, while double-bit errors result in a read error response. Read data parity is generated, and the corrected read data and corrected read data ECC check bits are then checked for bit errors. The corrupt location cache is searched for the read address, and a cache hit results in a read error response.

23 Claims, 11 Drawing Sheets

OVERLAPPING DATA INTEGRITY FOR SEMICONDUCTOR DEVICES

FIELD

The present disclosure relates generally to semiconductor devices, and more particularly to data integrity protection techniques in semiconductor devices.

BACKGROUND

Semiconductors devices are susceptible to single event upsets (SEUs) that could cause data corruption. These SEUs could be caused by alpha particles, device aging, manufacturing defects, or voltage or temperature variations outside the designed operating range. Random access memories (RAMs) are more susceptible to SEUs as compared to logic gates and registers. Semiconductors used in storage applications (such as a serial attached SCSI (SAS) RAID Controller) must be able to detect all SEUs that occur in the device's data path.

There exist a number of data integrity (DI) methods for detecting and correcting SEUs.

Parity is a data integrity method that can be used to detect a single bit error within the bits protected by the parity. Byte-level parity information may be generated by XORing all the bits of a byte together to generate a single bit of protection. Byte-level parity adds at least 12.5% overhead to the data path. Byte-level parity is a common method used to protect data buses inside semiconductors.

Error Correcting Code (ECC) is a data integrity method that can be used to detect and correct multi-bit errors. The number of errors that can be detected and corrected depends on the particular ECC method used. The number of ECC check bits required depends on the size of the bus it is protecting and the robustness of the ECC method being used. Since RAMs used inside semiconductors are more susceptible to SEUs, an ECC method is typically used to protect the data stored in the RAMs. In one RAM protection ECC embodiment 9 bits of ECC are used to protect 128 bits of data (~7% overhead) and are able to detect and correct all single bit errors and are able to detect all two bit errors.

A data path within a semiconductor device typically involves the data being stored in multiple pipelines that include both registers and RAMs. When a data path changes the data integrity method being used to protect it, it must do so in an overlapping manner in order to avoid a case where the data on the bus is left unprotected for one or more clock cycles. When the bus is unprotected, it is considered that a hole exists in the overall data integrity scheme and the data is vulnerable to an undetected data corruption.

An example of changing DI protection schemes using a non-overlapping method is illustrated in FIG. 1. In this example the old DI scheme is terminated in the same clock cycle the new DI scheme is generated. Since there is no DI check on the actual data wire segments that were used in the new generation of the new DI scheme as well as the actual wire segments that are being registered, there is no way to determine if there was a data corruption. FIG. 1 shows a system 100, incoming data 105, outgoing data 110, old DI information 115, new DI information 120, pipeline registers 125, 130, 135, 140, terminate old DI scheme logic 145, generate new DI scheme logic 150, Old DI Scheme status 155, DI Hole status 160, and New DI Scheme status 165.

An example of changing DI protection schemes using an overlapping method is shown in FIG. 2. In this example the new DI scheme is generated first and then in one or more pipeline stages later the old protection scheme is terminated. The data wires that are used to generate the new DI scheme are later checked for a DI error and an error detected on these wires will be detected. This method provides overlapping protection and guarantees that there will not be undetected data corruption. FIG. 2 shows a system 200, incoming data 205, outgoing data 210, old DI information 215, new DI information 120, pipeline registers 225, 230, 235, 240, 245, 250, generate new DI scheme logic 255, terminate old DI scheme logic 260, Old DI Scheme status 265, and New DI Scheme status 270.

In particular, it is desirable to provide cost effective and efficient overlapping data integrity when storing data path data from a bus protected by byte-level parity into a RAM protected by ECC and when retrieving data path data from a RAM protected by ECC to a data bus protected by byte-level parity. In this connection, cost effectiveness is generally related to having minimal area and power impact to the die, and efficiency is generally related to having minimal performance impact on the circuit.

One method of solving this problem is simply to store the data bus byte-level parity along with the data and RAM ECC, as illustrated in FIG. 3. This keeps the byte-level parity intact and prevents having to terminate and regenerate byte-level parity. Although this method is simple to implement and provides robust overlapping protection, it increases the storage RAM by 12.5% and thus impacts both die area and power. FIG. 3 shows a system 300, incoming address 305, write data 310, write data byte parity 315, uncorrectable error signal 320, read data 325, read data byte parity 330, RAM 335, ECC Gen logic 340, ECC Check & Correct logic 345, and pipeline registers 350, 355, 360, 365.

Another method is to terminate/generate the data bus byte-level parity protection scheme at the boundary of the RAM ECC protection scheme, as illustrated in FIG. 4. Inasmuch as this is not done in an overlapping manner, there is no guarantee that there is no undetected data corruption. In the case of a posted write transaction an extra clock cycle of latency in the write data path would be needed to provide the overlapping protection. This extra clock cycle impacts the performance of the circuit. FIG. 4 shows a system 400, address 405, write data 410, write data parity 415, write response 420, uncorrectable error signal 425, read data byte parity 430, RAM 435, ECC Gen logic 440, Byte Parity Check logic 445, Respond back with Error if Data Parity Err logic 450, ECC Check & Correct logic 455, Byte Parity Gen logic 460, and pipeline registers 465, 470, 475.

A number of partial solutions to these problems have been disclosed in the art.

For example, U.S. Pat. No. 8,316,277 to Flynn et al. describes a DI system and method comprising overlapping parity and ECC protection for data writes to and reads from a storage medium. Before the data is written to storage, the ECC is generated from the parity protected data, then the data is checked and the parity is terminated. The data is stored in storage with ECC protection. If the parity check revealed an error, the error is reported. The controller retrieves the ECC protected data from the storage. Parity protection is generated from this retrieved data, overlapping the two protection schemes. Meanwhile, the ECC protected data retrieved from the storage is checked and used to "continue to iterate to correct the errors".

United States Patent Application Publication No. 2007/0271468 A1 to McKenney et al. teaches an overlapping DI scheme whereby a receiving device is provided for saving the incoming protection information and then after the generation of the outgoing protection, a check of the data is performed using the incoming protection information.

There remains a need, however, of a method to provide an efficient and cost effective overlapping data integrity protection for a data bus protected by parity and a RAM protected by ECC.

BRIEF DESCRIPTION OF THE DRAWINGS

Embodiments of the present invention will now be described, by way of example only, with reference to the attached Figures as follows.

DETAILED DESCRIPTION

Figure 1:
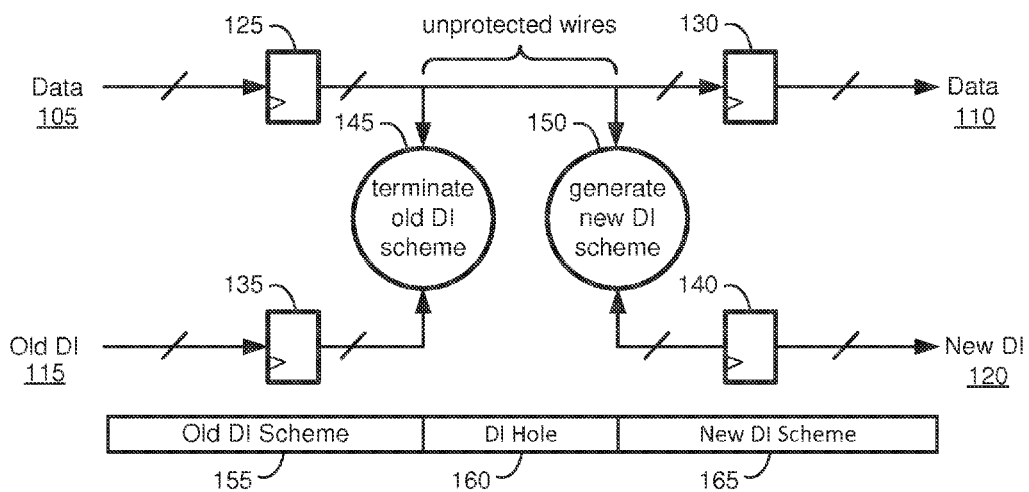
FIG. 1 is a block diagram illustrating a known DI protection scheme using a non-overlapping method.
Figure 2:
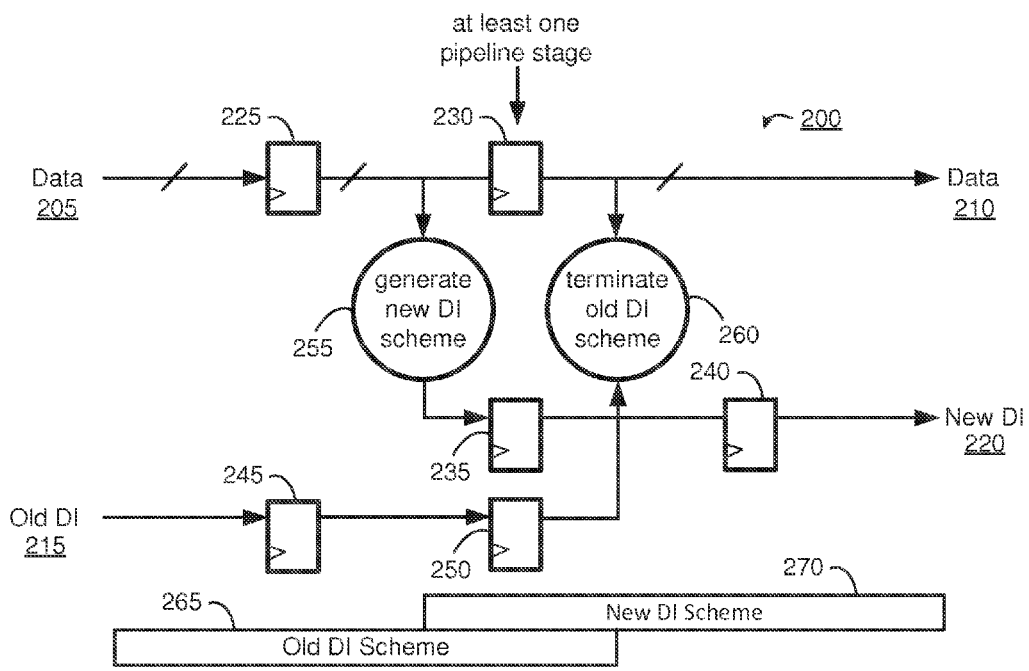
FIG. 2 is a block diagram illustrating a known DI protection scheme using an overlapping method.
Figure 3:
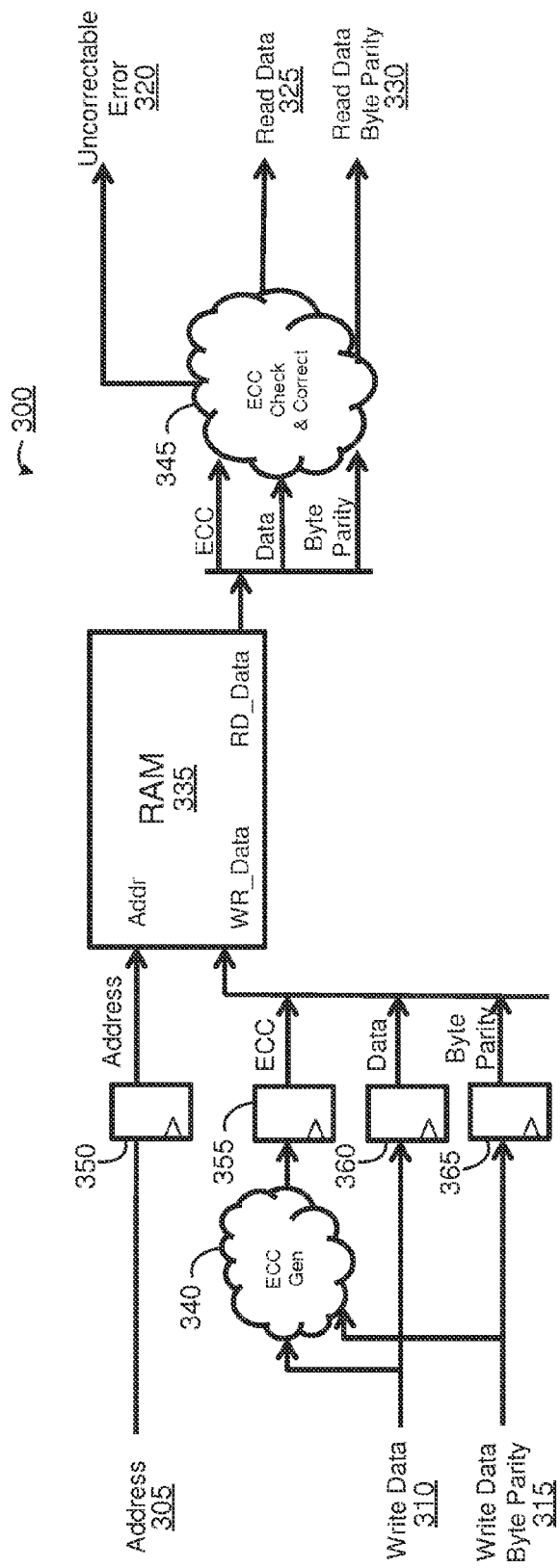
FIG. 3 is a block diagram illustrating a known DI protection scheme using an overlapping method wherein data bus byte-level parity is stored along with the data and RAM ECC.
Figure 4:
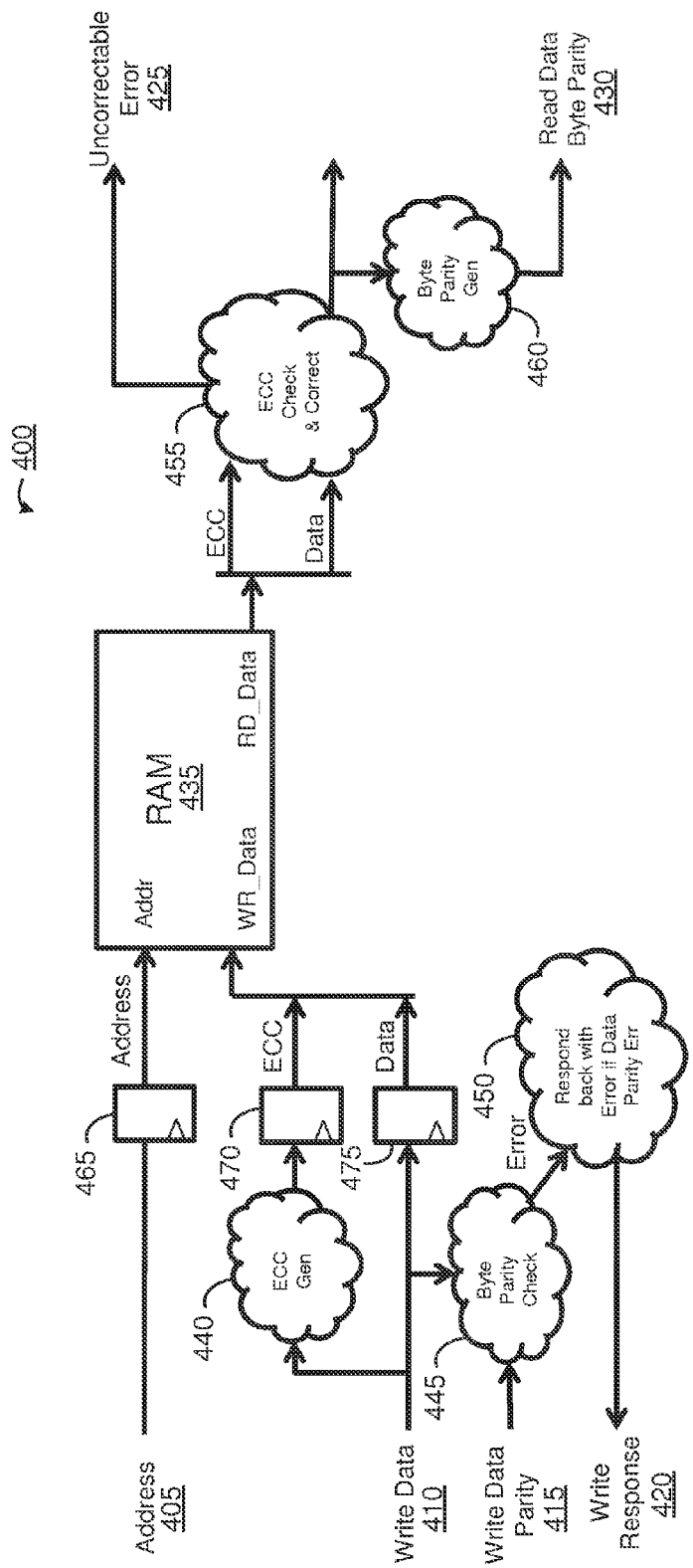
FIG. 4 is a block diagram illustrating a known DI protection scheme using a non-overlapping method wherein the data bus byte-level parity protection scheme is terminated/generated at the boundary of the RAM ECC protection scheme.

The techniques disclosed herein provide an efficient and cost effective overlapping data integrity protection by using a combination of a data bus protected by parity, a RAM protected by ECC, and a cache that stores the addresses of corrupted RAM memory locations. This approach does not increase the size of the data path RAMs and has minimal performance impact.

In general, embodiments of the technique include byte-level parity protected data buses, DI overlapping protection logic, byte-parity checking and generation logic, ECC checking, correcting, and generation logic, RAM, read and write response generation logic, and a cache used to store RAM locations that have known corrupted data as indicated by the DI information.

In addition, the technique may be implemented differently based on whether a memory transaction initiated by an initiator to a target is posted or non-posted. In a non-posted transaction, the initiator issues a write to the target and then waits for the target to respond back to the initiator indicating if the write was successful. It is then up to the initiator to determine how to prevent an unsuccessful write from causing further corruption. In a posted transaction, however, the initiator issues the write to the target and does not wait for a response from the target. It is then up to the target to determine how to contain a failure and prevent an unsuccessful write from causing further corruption.

In one embodiment, a data integrity protection method comprises the following steps. Write data, write data parity information, and a write address are received. Write data ECC information is generated based on the write data. Subsequently, the write data is parity checked based on the write data parity information. A write error response is generated if a write data parity error is detected. In this way, overlap is provided between the ECC and byte parity DI protections in the write operation. The write data and the write data ECC information are stored in a memory based on the write address without storing the write data parity information in the memory. Thus, memory resources are not consumed by storing the write data parity information.

In another embodiment, a data integrity protection method comprises the following steps. A read address is received, and read data and read data ECC information are retrieved from a memory based on the read address. Consistency is checked between the read data and the read data ECC information, any single-bit errors detected in the read data and the read data ECC information are corrected to produce corrected read data and corrected read data ECC information, and a read error response is generated if any multi-bit error is detected. Subsequently, corrected read data parity information is generated based on the corrected read data. Subsequently, consistency is checked between the corrected read data and the corrected read data ECC information, and the read error response is generated if any bit errors are detected. In this way, overlap is provided between the ECC and byte parity DI protections in the read operation.

In another embodiment, a data integrity protection circuit comprises the following. An ECC generation logic receives write data and generates write data ECC information based on the write data. Byte parity check logic receives the write data and write data parity information, and parity checks the write data based on the write data parity information to detect any write data parity error after the ECC generation logic has generated the write data ECC information. A memory receives a write address, the write data, and the write data ECC information from the ECC generation logic, and stores the write data and the write data ECC information based on the write address, wherein the memory is free from storing the write data parity information. Write response generation logic generates a write error response if the byte parity check logic detects any write data parity error. The memory also receives a read address and retrieves read data and read data ECC information based on the read address. ECC check and correct logic receives the read data and the read data ECC information from the memory, checks consistency between the read data and the read data ECC information, corrects any single-bit errors detected in the read data and the read data ECC information to produce corrected read data and corrected read data ECC information, and detects any multi-bit errors. Byte parity generation logic receives the corrected read data from the ECC check and correct logic and generates corrected read data parity information based on the corrected read data. ECC check logic, after the byte parity generation logic has generated the corrected read data parity information, receives the corrected read data and the corrected read data ECC information, checks consistency between the corrected read data and the corrected read data ECC information, and detects any further bit errors. Read response generation logic generates a read error response if the ECC check and correct logic detects any multi-bit errors or the ECC check logic detects any further bit errors.

Further embodiments are shown in FIGS. 5-10. These embodiments are particularly advantageous when the transaction is posted, and thus it is then up to the target to determine how to contain a failure and prevent an unsuccessful write from causing further corruption.

Figure 5:
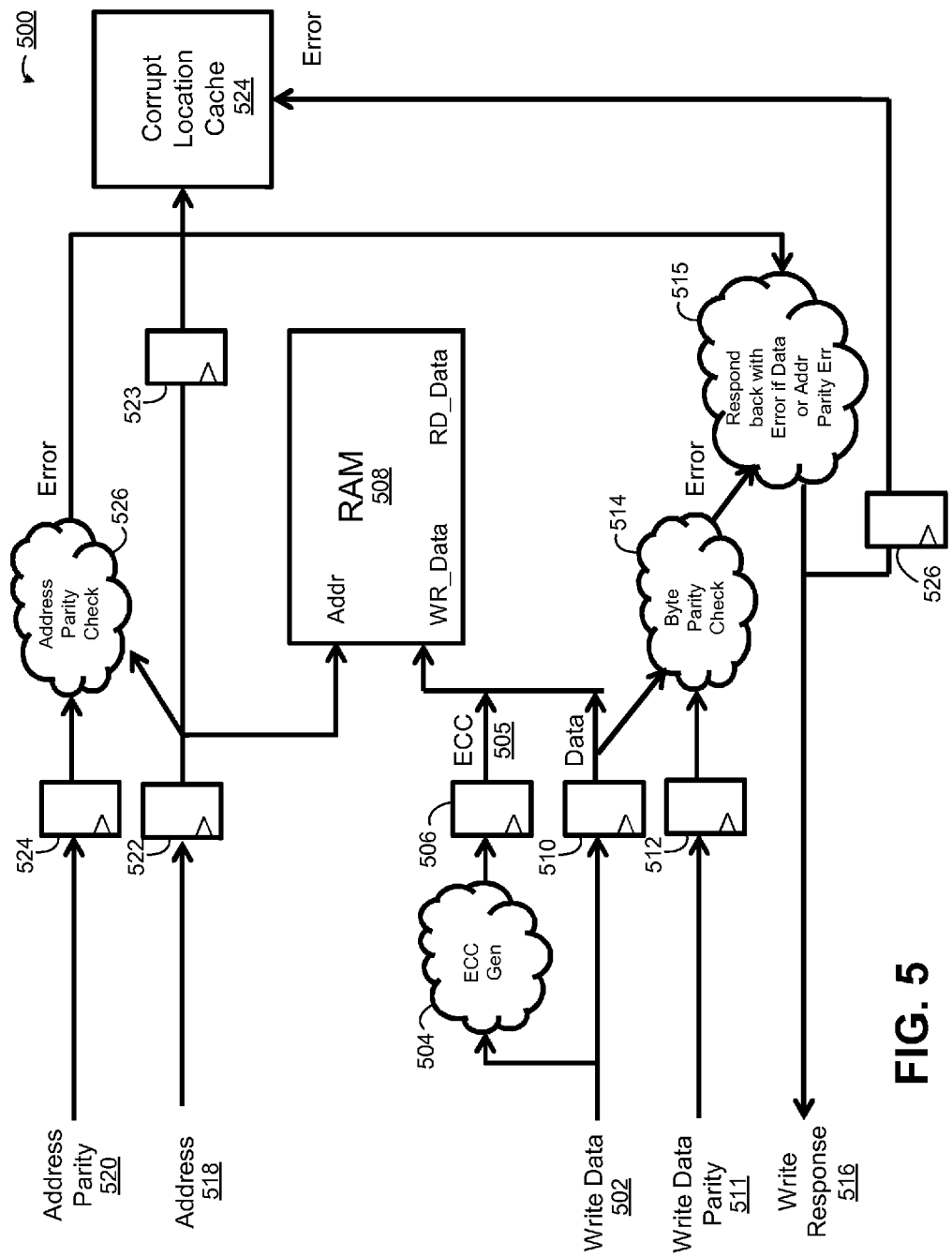
FIG. 5 is a block diagram illustrating a DI protection scheme for a write operation having a pipeline stage in the ECC write path according to an embodiment.

FIG. 5 shows a block diagram of a system 500 configured to perform a RAM write operation wherein a pipeline stage is provided in the write ECC path. Write data 502 on a write data bus is received by an ECC generation logic 504. The generated ECC check bits 505 are then received by a pipeline register 506, and are then received by and written in RAM 508. The write data 502 is also received by another pipeline register 510 and is likewise received by and written in the RAM 508. Write data parity information 511 is received by another pipeline register 512 and thence to a byte parity check logic 514 which also receives the write data from pipeline register 510. The byte parity check logic 514 determines any parity error, which is received by write response generation logic 515, which outputs a write response 516.

As is known in the art, each pipeline register is effective to store the signal at its input in a first clock cycle and to express the signal at its output in the next clock cycle, and may be implemented by any suitable means known in the art such as a latch or flip-flop.

It will thus be appreciated that placement of byte party check logic 514 after pipeline registers 510 and 512 causes the parity checking of write data 502 based on write data parity information 511 to be performed after ECC check bits 505 have been generated by ECC generation logic 504, thereby providing overlap between the byte parity and ECC protections.

A write address 518 and address parity information 520 are received by respective pipeline registers 522 and 524, and both thence to address parity check logic 526 which outputs any parity error to the write response generation logic 515. The write address 518 is also received from pipeline register 522 by RAM 508 for indexing the write of write data 502 and the ECC 505. The write address 518 is also received from pipeline register 522 by a further pipeline register 523 and thence to a corrupt location cache 524. The write response 516 is also received by another pipeline register 526 and thence to the corrupt location cache 524.

Thus, the address 518 of the write transaction and associated write response 516 are sent to the corrupt location cache 524 after a pipeline stage (pipeline registers 523 and 526). If the write response 516 indicates the write had a failure, then the address 518 is stored in the corrupt location cache 524. If the write response 516 indicates the write did not have a failure, then the address 518 is searched in the corrupt location cache 524, and if it is present then it is removed from the cache 524 (the location no longer has corrupt data). It will be appreciated that in the case of an address parity error as determined by the address parity check logic 526, then it is appropriate to store the corresponding address 518 in the cache 524 since the data 502 stored at this address 518 in the RAM 508 was incorrectly overwritten and is now considered corrupted.

The corrupted location cache can store up to a predetermined number, 'n' different addresses that have corrupt data. The cache also has a status indicating if it is currently in an "overflow" condition. An overflow condition is declared when there are 'n' addresses currently in the cache and an additional address is being added. In one embodiment, once in the "overflow" status condition no addresses can be added or deleted from the cache and the only recovery is a device reset. As indicated below, all reads from the RAM while the cache is in an "overflow" state will result in a read response error.

To clarify, when a write is performed and no error is detected (address or data parity) and the cache is not in the "overflow" state, then the write address is searched in the cache and if the address is found it is removed from the cache. When a write is performed and an error is detected and the cache is not in the "overflow" state, then the write address is added to the cache.

Figure 6:
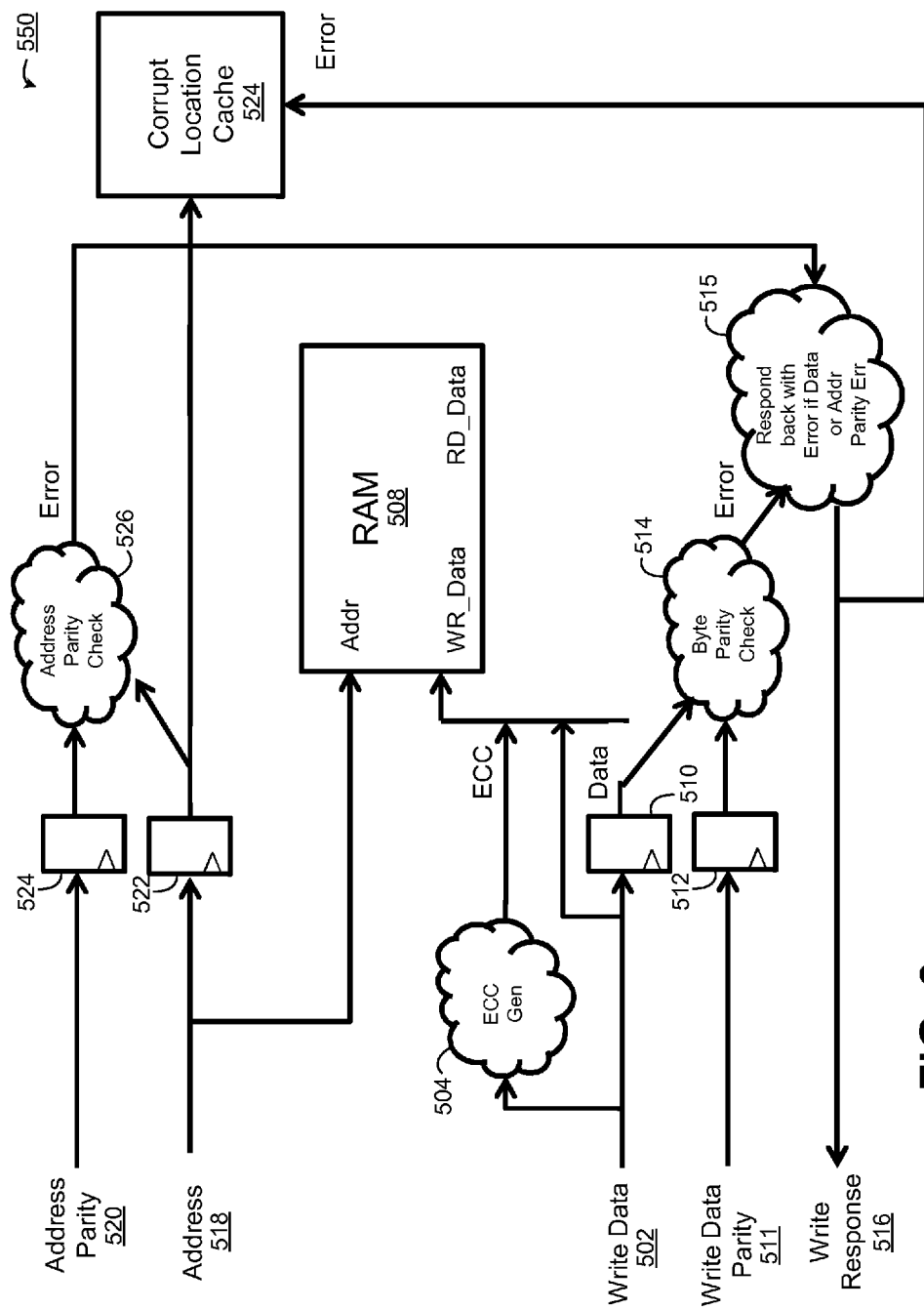
FIG. 6 is a block diagram illustrating a DI protection scheme for a write operation without a pipeline stage in the ECC write path according to another embodiment.

FIG. 6 shows a block diagram of a system 550 configured to perform a RAM write operation wherein a pipeline stage is not provided in the write ECC path. System 550 is generally similar to system 500, except that a pipeline stage is not used in the write ECC path, and therefore pipeline registers 506, 523, and 526 are not provided. Moreover, RAM 508 receives the write data 502 directly from the write initiator instead of from pipeline register 510, and further receives address 518 directly from the write initiator instead of from pipeline register 522.

Figure 7:
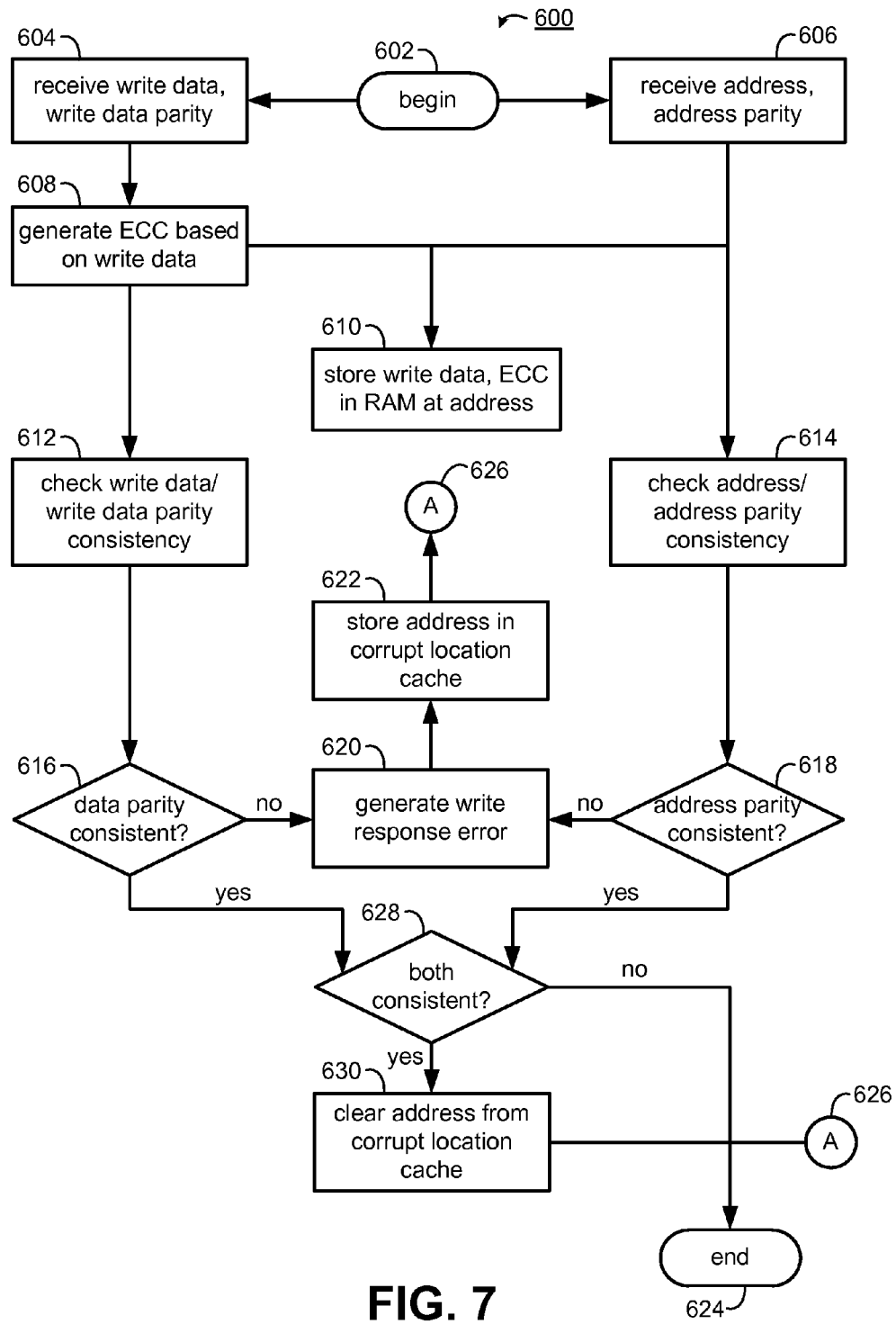
FIG. 7 is a flowchart illustrating a DI protection method for a data write operation according to another embodiment.

FIG. 7 shows a flowchart of a RAM write method 600. The method begins (begin 602) by receiving write data and write data parity information (step 604) and a corresponding address and address parity information (step 606). ECC check bits are generated from the write data (step 608). In one embodiment, the address, address parity information, write data, write data parity information, and ECC check bits are stored in respective pipe-line registers. After the pipeline stage, if provided, the write data and ECC check bits are written to the RAM based on the address (step 610), free from storing the write data parity. After the ECC check bits are generated, the write data parity is checked (step 612) and the address parity is checked (step 614), and if the data parity is inconsistent (decision 616) or if the address parity is inconsistent (step 618) then a write response error is generated 620 and the address is stored in a corrupt location cache 622. This branch of the method then ends (end 624) via connector 626. It will be appreciated that checking data parity after generating the ECC check bits achieves the end of providing overlapping DI. If both the data parity and the address parity are consistent (decision 628), however, then the address is cleared from the corrupt location cache if it is present in the corrupt location cache (step 630). In either case, this branch of the method then ends (end 624).

Figure 8:
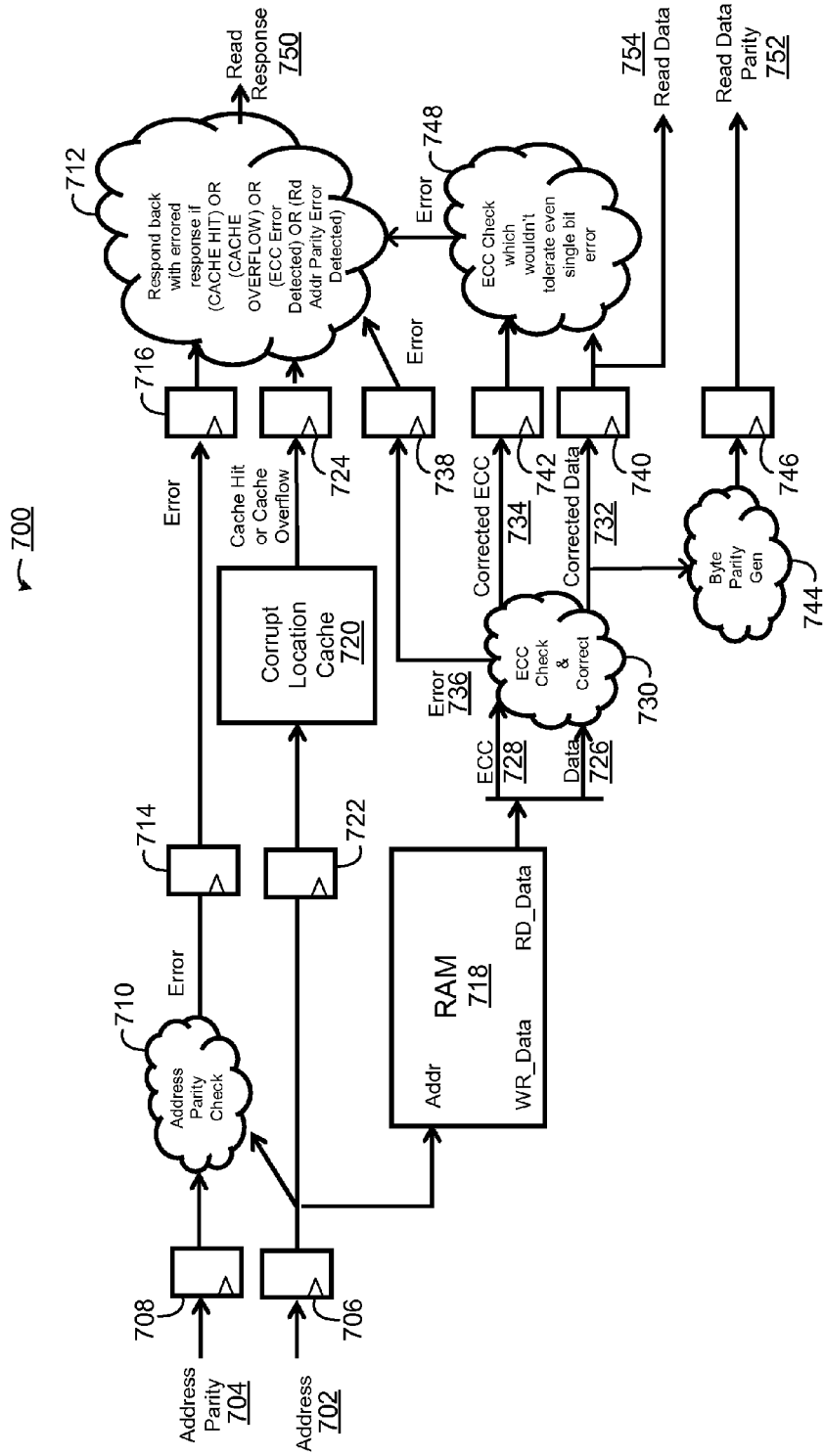
FIG. 8 is a block diagram illustrating a DI protection scheme for a read operation having a pipeline stage in the address and address parity paths according to another embodiment.

FIG. 8 shows a block diagram of a system 700 configured to perform a RAM read operation when a pipeline stage is provided in the read address and address parity path. Read address 702 and read address parity information 704 are received and stored at respective pipeline registers 706 and 708, and both thence to address parity check logic 710 which checks the address parity. If an address parity error is detected, then an error signal is asserted to the read response logic 712 via two pipeline stages—pipeline registers 714 and 716—to match the timing of the associated read data.

The address 702 is received from pipeline register 706 at RAM 718 (which may be identical to RAM 508) and used to make a read access to the RAM 718, and is also sent to corrupt location cache 720 (which may be identical to corrupt location cache 524) (via an additional pipeline stage—pipeline register 722). If the corrupt location cache 720 is not currently in an "overflow" state, then the address 702 sent to the corrupt location cache 720 and is searched in the cache 720 and if the address 702 is present in the cache 720, or if the cache 720 is currently in the "overflow" state, then an error signal is asserted to the read response logic 712 via a further pipeline register 724.

The read data from the RAM 718, including data 726 and ECC check bits 728, are sent to the ECC check and correct logic 730. If the ECC check and correct logic 730 detects a single bit error based on the data 726 and ECC check bits 728, then it will correct the data 726 and ECC check bits 728 to produce corrected data 732 and corrected ECC check bits 734, respectively. If the ECC check and correct logic 730 detects a double-bit error, then an error signal 736 is asserted to the read response logic 712 (via a pipeline stage—pipeline register 738—to match the timing of the associated read data).

The corrected data 732 and corrected ECC check bits 734 output from the ECC check and correct logic 730 are sent to a pipeline stage—pipeline registers 740 and 742, respectively—and the corrected data 732 is also send to byte parity generation logic 744. The generated data parity information 752 is stored in a pipeline stage—pipeline register 746—and then output.

After the pipeline stage—pipeline registers 740 and 742—the corrected data 732 and corrected ECC check bits 734 are checked again by ECC check logic 748, and if any error is detected (including even a single bit error) then an error signal is asserted to the read response logic 712. It will thus be appreciated that pipeline registers 740 and 742 cause this further ECC check to occur after generation of data parity information 752, thereby providing overlapping DI protection.

A read response error 750 is generated by the read response logic 712 if any of the following errors were detected during the read transaction:
  address parity error;
  corrupt location cache is currently in an "overflow" state;
  address present in corrupt location cache;
  double bit error detected in ECC check and correct logic (first ECC check); or
  any bit error detected in ECC check logic (second ECC check).

In any event, the corrected data 732 is received from the pipeline register 740 and output as final read data 754, along with the generated data parity information 752.

Figure 9:
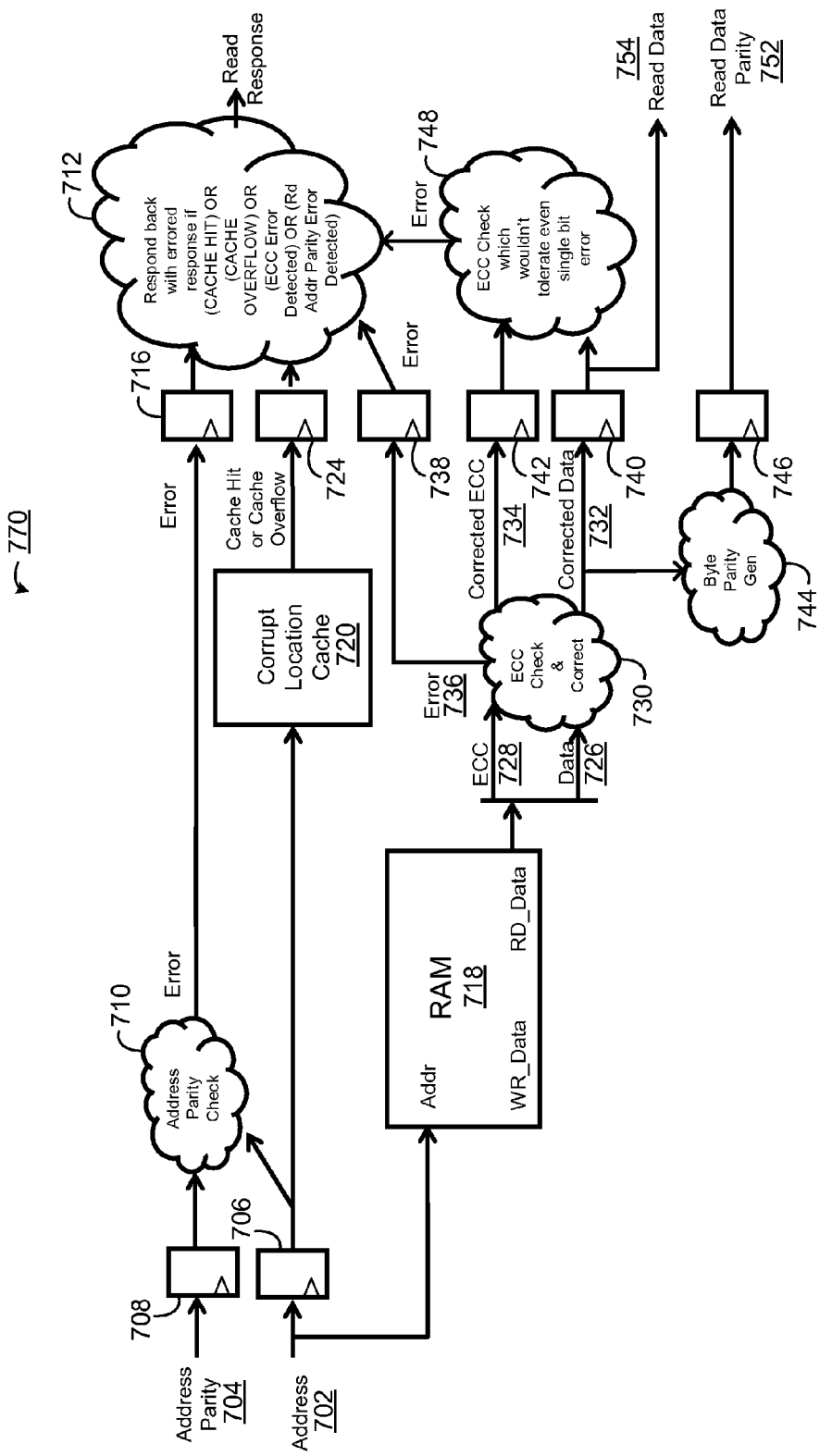
FIG. 9 is a block diagram illustrating a DI protection scheme for a read operation without a pipeline stage in the address and address parity paths according to another embodiment.

FIG. 9 shows a block diagram of a system 770 configured to perform a RAM read operation when a pipeline stage is not provided in the read address and address parity path. System 770 is generally similar to system 700, except that a pipeline stage is not used in the read address and address parity path, and therefore pipeline registers 714 and 722 are not provided. Moreover, RAM 718 receives the address 702 directly from the read initiator instead of from pipeline register 706.

It will be understood that the read circuitry shown in FIGS. 8 & 9 may be implemented together with or separately from the write circuitry shown in FIGS. 6 & 7, respectively. In the former case, RAM 508 may be one and the same as RAM 718, and corrupt location cache 524 may be one and the same as corrupt location cache 720. Similarly, pipeline registers 522, 523, 524 may be one and the same as pipeline registers 706, 722, 708, respectively, and address parity check logic 526 may be one and the same as address parity check logic 710. In this connection, it is noted that in FIGS. 8 & 9 the arrangement of the address and address parity check components are selected so as to reproduce the corresponding elements in FIGS. 6 & 7, which will be the case when the read and write circuitry is implemented together. It will be understood, however, that alternative implementations are possible.

Figure 10:
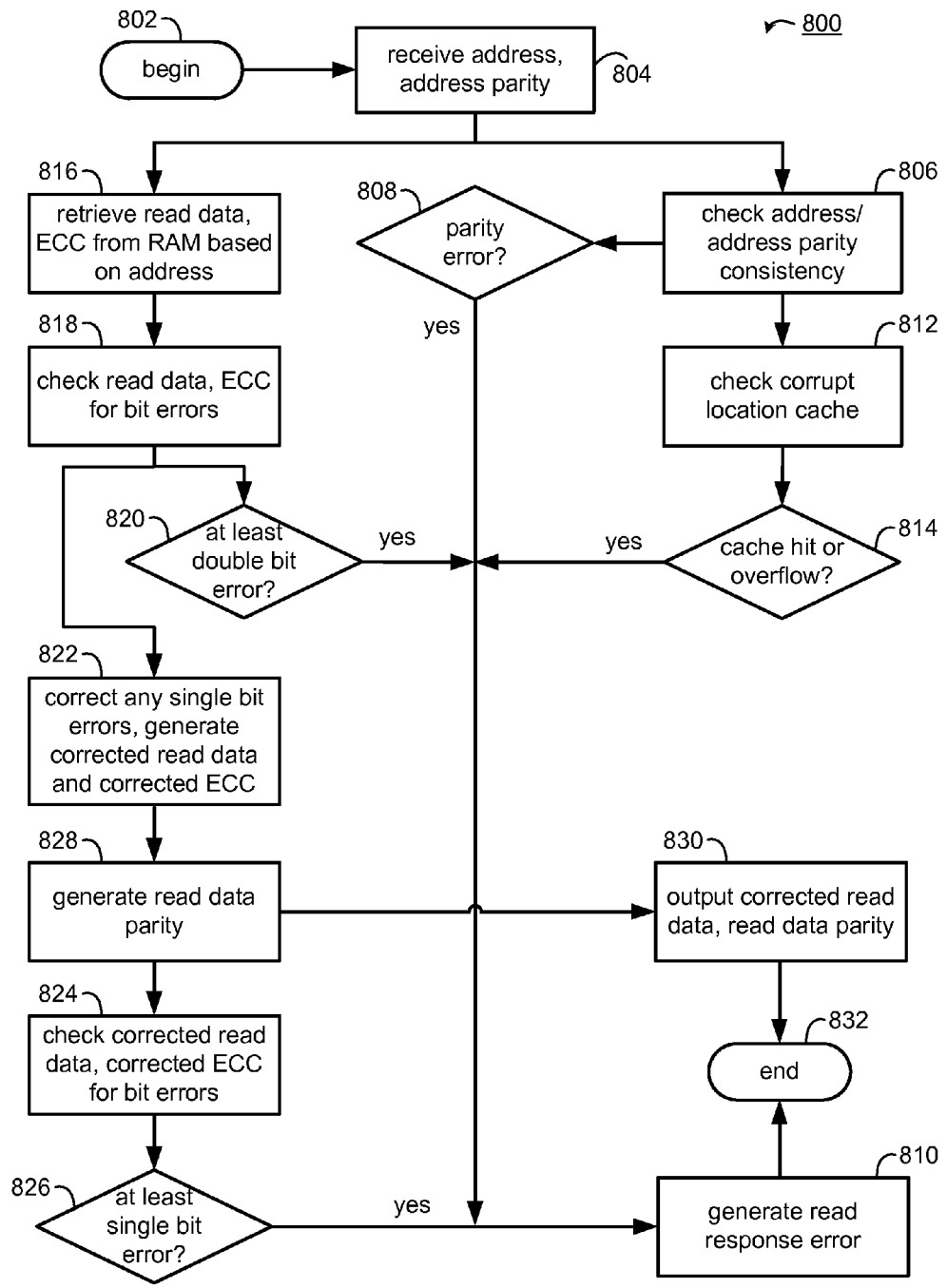
FIG. 10 is a flowchart illustrating a DI protection method for a data read operation according to another embodiment.

FIG. 10 shows a flowchart of a RAM read method 800. The method begins (begin 802) by receiving an address and address parity information (step 804). In a first branch, the address and address parity information are checked for consistency (step 806) and if a parity error is detected (decision 808) then a read response error is generated (step 810). A corrupt location cache is checked for the address (step 812), and if a cache hit or cache overflow condition is detected (decision 814), then the read response error is generated (step 810). In the second branch, following the step of receiving the address and address parity (step 804), read data and ECC check bits are retrieved from a RAM based on the address (step 816). The read data and ECC check bits are checked for bit errors (step 818). If at least a double bit error is detected (decision 820), then the read response error is generated (step 810). Any detected single bit errors are corrected, and corrected read data and corrected ECC check bits are generated (step 822). Read data parity information is then generated (step 828). Then, the corrected read data and corrected ECC check bits are again checked for bit errors (step 824), and if even a single bit error is detected (decision 826), then the read response error is generated (step 810). The corrected read data and generated data parity information are output (step 830). The method then ends (step 832).

It will be appreciated, therefore, that checking the corrected read data and corrected ECC check bits after the read data parity information is generated provides an overlap between the byte parity and ECC DI protections.

The above embodiments are advantageous in the situation when an initiator of a write makes a posted write operation, in which case the initiator does not wait for a write response indicating if the write was successful. If the write was not successful then it is the responsibility of the initiator of a read operation to prevent the corrupted data from being used based on maintenance of the corrupted location cache and the generation of a read error response.

In alternative embodiments the initiator of a write makes a non-posted write operation, and thus the initiator waits for a write response indicating if the write was successful. In such case, if the write was not successful, then it is the responsibility of the initiator to prevent the corrupted data from being used. In this case the corrupted location cache may be omitted since the initiator is required to make sure the corrupted location is not accessed based on the write response. As such, references to the corrupt location cache are not required during a read operation, in which case a read response error is generated based only on multi-bit ECC errors or ECC correction failures (remaining ECC errors following correction) and address parity.

Figure 11:
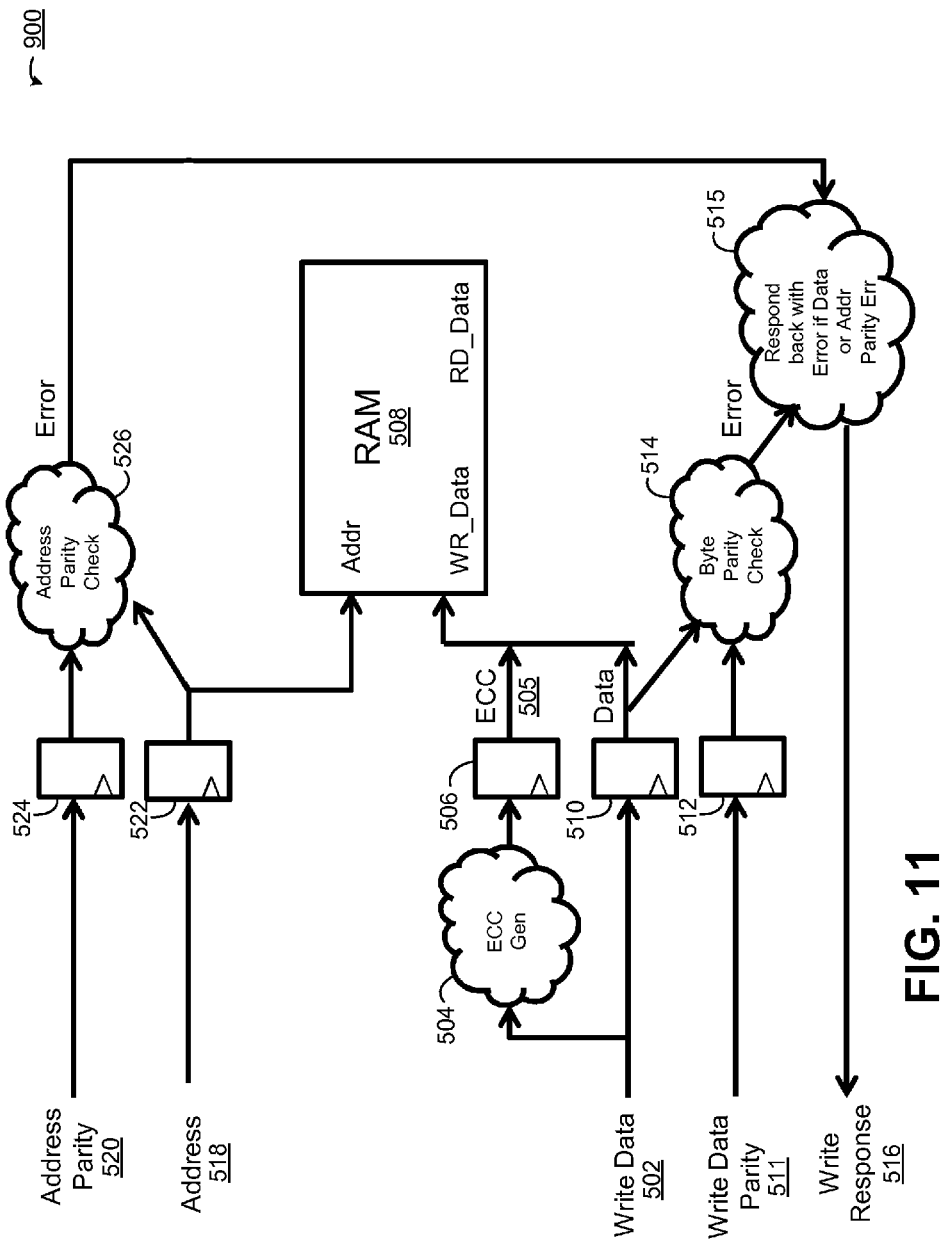
FIG. 11 is a block diagram illustrating a DI protection scheme for a write operation similar to the embodiment in FIG. 5, but wherein the corrupt location cache is omitted.
Figure 12:
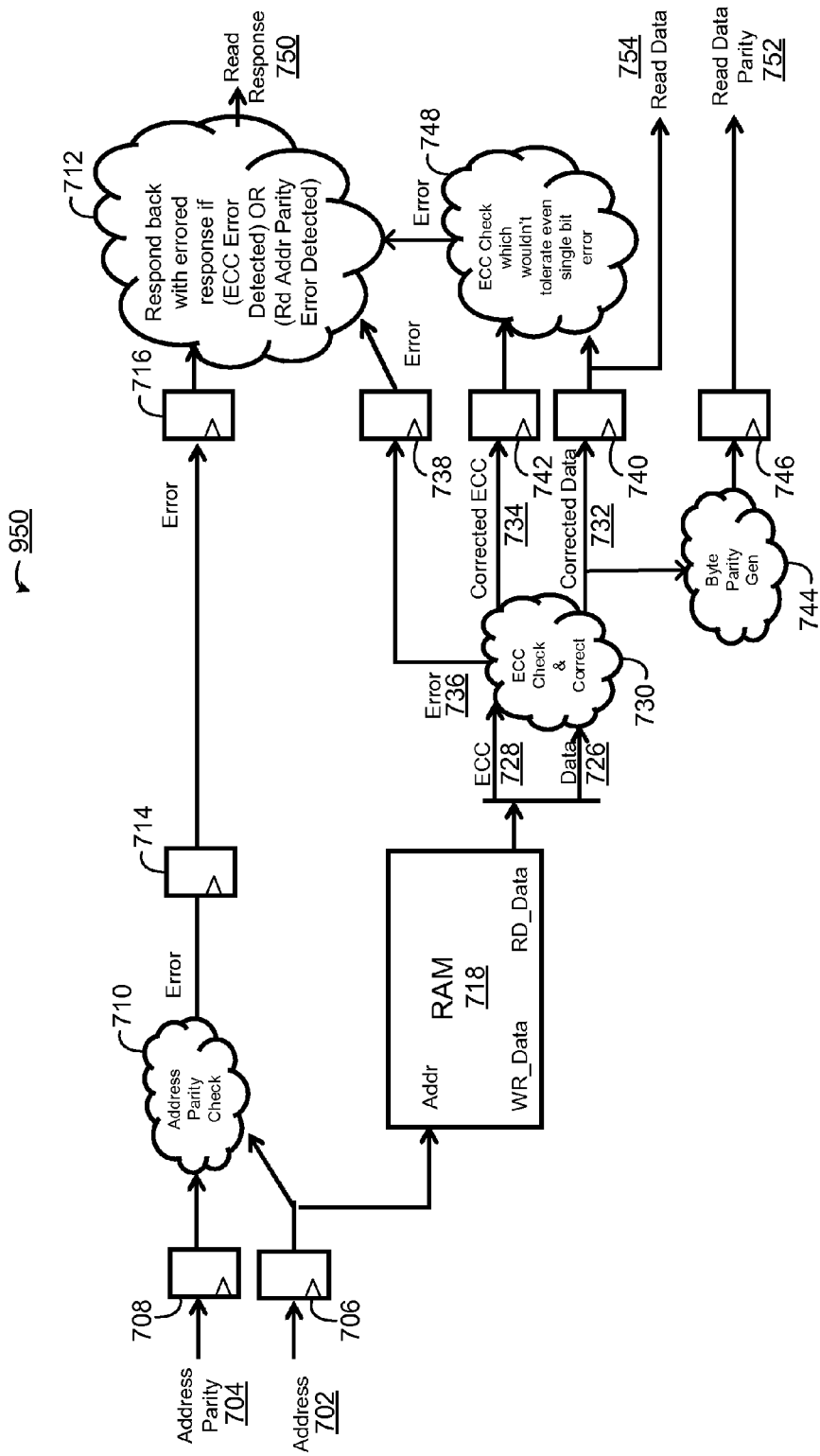
FIG. 12 is a block diagram illustrating a DI protection scheme for a read operation similar to the embodiment in FIG. 8, but wherein the corrupt location cache is omitted.

Thus, FIG. 11 shows a block diagram of a system 900 similar to system 500 shown in FIG. 5, except that corrupt location cache 524 and pipeline registers 523 and 526 are omitted. Similarly, FIG. 12 shows a block diagram of a system 950 similar to system 700 shown in FIG. 8, except that corrupt location cache 720 and pipeline registers 722 and 724 are omitted.

Embodiments of the disclosed technique accomplish robust overlapping DI protection when using a RAM in a data path without increasing the size of the data path RAM. By not storing byte parity information in the RAM, which thereby requires an increase the size of the data path RAM, both cost (die area) and power are optimized. Traditional solutions to this problem either increase the size of the RAM to store the data path DI protection scheme with the data in the RAM—thereby undesirably increasing the size of the RAM—or have terminated/generated the data path DI at the same time the RAM ECC is generated/terminated—thereby failing to provide overlapping protection and rendering the scheme susceptible to undetected SEUs.

It will be appreciated that while the above embodiments generally employ address parity check and error generation based thereon, in alternative embodiments no address parity checking is performed, and thus error generation and corrupt location cache operation and management are based exclusively on errors detected in connection with data ECC or parity checking. In such case, the components specified above for use in connection with address parity checking may be dispensed with.

While the above embodiments comprise, employ, or interconnect with a RAM, it will be appreciated that the systems and methods may be implemented alternatively with different types of memory with the principles described herein applying in accordance with the particulars of such alternative memory type. Similarly, alternative components may be substituted for the exemplary components specified above so long as they perform sufficiently similar functions in accordance with the principles described above. For example, one or more of the pipeline registers specified above may be replaced with an alternative delay element so long as such replacement is effective to delay signal propagation based on a reference clock in accordance with the timing shown or implied by the above-described embodiments.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A data integrity protection method comprising:
receiving write data, write data parity information, and a write address;
generating write data error correcting code (ECC) information based on the write data;
subsequently parity checking the write data based on the write data parity information;
generating a write error response if a write data parity error is detected;
storing the write data and the write data ECC information in a memory based on the write address without storing the write data parity information in the memory; and
storing the write address in a corrupt location cache if the write data parity error is detected.

2. A data integrity protection method comprising:
receiving write data, write data parity information, and a write address;
generating write data error correcting code (ECC) information based on the write data;
subsequently parity checking the write data based on the write data parity information;
generating a write error response if a write data parity error is detected;
storing the write data and the write data ECC information in a memory based on the write address without storing the write data parity information in the memory;
receiving write address parity information;
parity checking the write address based on the write address parity information; and
generating the write error response if a write address parity error is detected.

3. The data integrity protection method according to claim 2 further comprising:
subsequent to generating the write data ECC information and prior to parity checking the write data and parity checking the write address, storing the write data, the write data parity information, the write address, and the write address parity information in pipeline registers.

4. The data integrity protection method according to claim 2 further comprising:
storing the write address in a corrupt location cache if either the write data parity error is detected or the write address parity error is detected.

5. The data integrity protection method according to claim 4 further comprising:
clearing the write address from the corrupt location cache if neither the write data parity error nor the write address parity error is detected.

6. The data integrity protection method according to claim 4 further comprising:
generating a cache overflow condition if either the write data parity error is detected or the write address parity error is detected, and the corrupt location cache already stores a predetermined number of addresses.

7. A data integrity protection method comprising:
receiving a read address;
retrieving read data and read data error correcting code (ECC) information from a memory based on the read address;
checking consistency between the read data and the read data ECC information, correcting any single-bit errors detected in the read data and the read data ECC information to produce corrected read data and corrected read data ECC information, and generating a read error response if any multi-bit error is detected;
subsequently generating corrected read data parity information based on the corrected read data; and subsequently checking consistency between the corrected read data and the corrected read data ECC information, and generating the read error response if any bit errors are detected.

8. The data integrity protection method according to claim 7 further comprising:
prior to checking consistency between the corrected read data and the corrected read data ECC information, storing the corrected read data and the corrected read data ECC information in pipeline registers.

9. The data integrity protection method according to claim 7 further comprising:
searching a corrupt location cache for the read address, and generating the read error response if the read address is found in the corrupt location cache.

10. The data integrity protection method according to claim 9 further comprising:
generating the read error response if the corrupt location cache is in a cache overflow condition.

11. The data integrity protection method according to claim 7 further comprising:
receiving read address parity information;
parity checking the read address based on the read address parity information; and
generating the read error response if a read address parity error is detected.

12. The data integrity protection method according to claim 7, wherein the memory is a random access memory.

13. A data integrity protection circuit comprising:
error correcting code (ECC) generation logic for receiving write data and generating write data ECC information based on the write data;
byte parity check logic for receiving the write data and write data parity information, for parity checking the write data based on the write data parity information to detect any write data parity error after the ECC generation logic has generated the write data ECC information;
a memory for receiving a write address, the write data, and the write data ECC information from the ECC generation logic, and for storing the write data and the write data ECC information based on the write address, wherein the memory is free from storing the write data parity information;
write response generation logic for generating a write error response if the byte parity check logic detects any write data parity error;
the memory for receiving a read address and for retrieving read data and read data ECC information based on the read address;
ECC check and correct logic for receiving the read data and the read data ECC information from the memory, for checking consistency between the read data and the read data ECC information, for correcting any single-bit errors detected in the read data and the read data ECC information to produce corrected read data and corrected read data ECC information, and for detecting any multi-bit errors;
byte parity generation logic for receiving the corrected read data from the ECC check and correct logic and for generating corrected read data parity information based on the corrected read data;
ECC check logic for, after the byte parity generation logic has generated the corrected read data parity information: receiving the corrected read data and the corrected read data ECC information, checking consistency between the corrected read data and the corrected read data ECC information, and detecting any further bit errors; and
read response generation logic for generating a read error response if the ECC check and correct logic detects any multi-bit errors or the ECC check logic detects any further bit errors.

14. The data integrity protection circuit according to claim 13, further comprising:
pipeline registers for receiving the write data and the write data parity information, wherein the byte parity check logic receives the write data and the write data parity information from the pipeline registers after the ECC generation logic has generated the write data ECC information.

15. The data integrity protection circuit according to claim 13, further comprising:
a corrupt location cache for receiving and storing the write address when the write response generation logic generates the write error response.

16. The data integrity protection circuit according to claim 15, wherein the corrupt location cache clears the write address when the write response generation logic refrains from generating the write error response.

17. The data integrity protection circuit according to claim 15, wherein the corrupt location cache generates a cache overflow condition when the write response generation logic generates the write error response and the corrupt location cache already stores a predetermined number of addresses.

18. The data integrity protection circuit according to claim 13, wherein the corrupt location cache receives and searches the read address and reports a cache hit if the read address is stored in the corrupt location cache, wherein the read response generation logic also generates the read error response if the corrupt location cache reports a cache hit.

19. The data integrity protection circuit according to claim 13, wherein the read response generation logic also generates the read error response if the corrupt location cache is in a cache overflow condition.

20. The data integrity protection circuit according to claim 13, further comprising:
read address parity check logic for receiving the read address and read address parity information, and for parity checking the read address based on the read address parity information to detect any read address parity error,
wherein the read response generation logic also generates the read error response if the read address parity check logic detects any read address parity error.

21. The data integrity protection circuit according to claim 13, wherein the memory is a random access memory.

22. The data integrity protection circuit according to claim 13, further comprising:
write address parity check logic for receiving the write address and write address parity information, and for parity checking the write address based on the write address parity information to detect any write address parity error,
wherein the write response generation logic also generates the write error response if the address parity check logic detects any write address parity error.

23. The data integrity protection circuit according to claim 13, further comprising:
pipeline registers for receiving the corrected read data and the corrected read data ECC information, wherein the ECC check logic receives the corrected read data and the corrected read data ECC information from the pipeline registers after the byte parity generation logic has generated the corrected read data parity information.

* * * * *